Jan. 25, 1927.  
C. F. GAINE  
1,615,220  
TRANSMISSION GEAR SHIFT  
Filed March 18, 1925
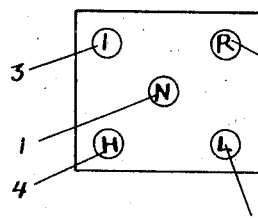
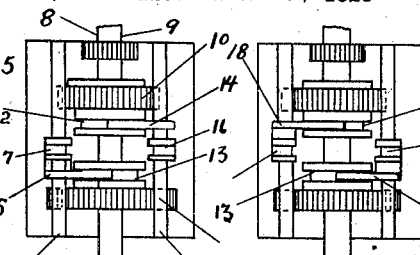
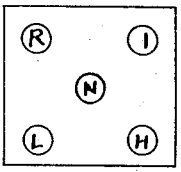
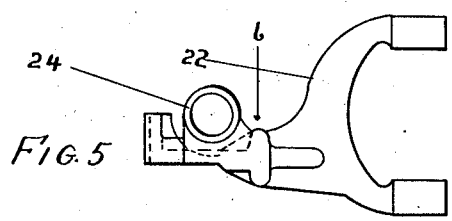
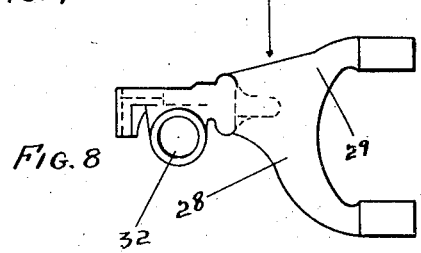
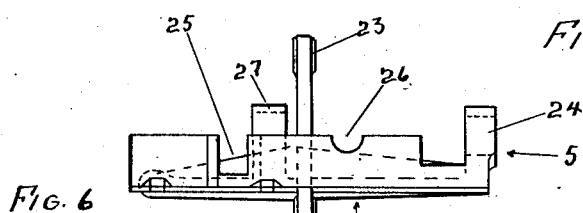
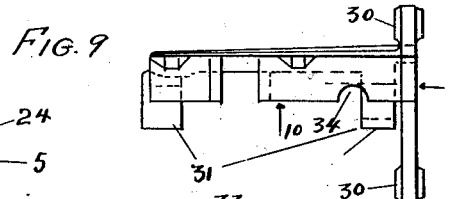
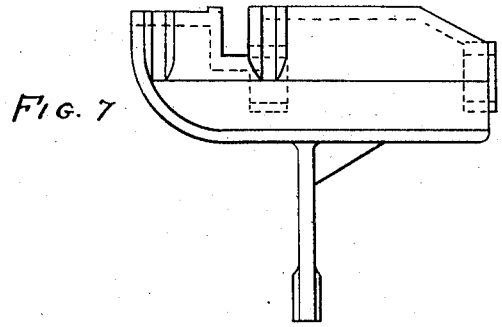
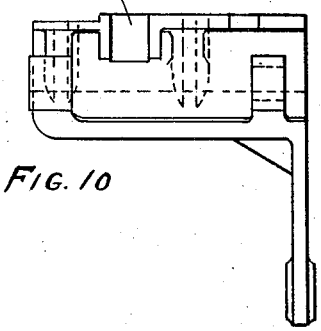
INVENTOR.  
CHARLES FREDERICK GAINE.  
BY Harry Schroeder  
ATTORNEYS.

Patented Jan. 25, 1927.

1,615,220

UNITED STATES PATENT OFFICE.

CHARLES FREDERICK GAINE, OF OAKLAND, CALIFORNIA, ASSIGNOR TO THE G. E. S. CO., OF OAKLAND, CALIFORNIA, A COPARTNERSHIP.

TRANSMISSION GEAR SHIFT.

Application filed March 18, 1925. Serial No. 16,391.

My invention is an improvement in the transmission gear shift, and in particular in the shifting forks for automobiles. The special feature of my invention pertains to forks adapted to change unusual or out of the ordinary gear shift to the so called "standard," and applies particularly to the changing of the gear shift now used on the Buick automobile to the so called "standard" gear shift.

With the Buick gear shift, the positions of the gear shift lever, as looking from the driver's seat, comprises a central position for neutral, the intermediate and high are on the left hand side, front and back respectively, and the reverse and low are on the right hand side front and back respectively. The so called standard gear shift has a central position for neutral, reverse and low on the left hand side, front and back respectively, and the intermediate and high on the right hand side, front and back respectively.

The present shifting forks cannot be changed over to operate the slide gears, therefore, I have invented shifting forks which may be applied to the particular slide gears and other parts of the Buick transmission in order to give the standard gear shift. This will simplify and make safer the driving of this particular make of car by people who have had experience with the standard. The shifting forks may be readily installed in place of those now used without any alteration of the other mechanism. My shifter forks could also be used, without material departure from the design shown, on other automobiles which have an out of the ordinary gear shift, which it is required to change to a standard.

My invention will be more readily understood from the following description and drawings in which:—

Figure 1 is a gear shift diagram of an out of the ordinary gear shift and shows that now used on the present Buick automobiles.

Figure 2 is a so called standard gear shift diagram which it is desired to use.

Figure 3 is a diagrammatic plan of a transmission box cut away giving a schematic illustration of the present Buick gears and shifting forks.

Figure 4 is a diagrammatic plan of a transmission box cut away giving a schematic illustration of the Buick shift gears, with my shifting forks installed to give the standard gear shift.

Figures 5, 6 and 7 are different views of the high and intermediate shifter fork, in which Figure 5, is an end view of Figure 6 in the direction of the arrow 5, and represents a view lengthwise of the transmission. Figure 6 is a plan looking at Figure 5, in the direction of the arrow 6. Figure 7 is an elevation looking at Figure 6 in the direction of the arrow 7.

Figures 8, 9 and 10 are different views of the low and reverse shifter fork, in which Figure 8 is an end view of Figure 9, in direction of the arrow 8, and represents a view lengthwise of the transmission. Figure 9 is a plan looking at Figure 8, in the direction of the arrow 9. Figure 10 is an elevation looking at Figure 9 in the direction of the arrow 10.

Referring to Figures 1 and 2, the neutral position 1 of the shift lever is indicated by the letter " N ". The low 2 is indicated by the letter " L ". Intermediate 3 is indicated by the letter " I ", the high 4 by the letter " H ", and the reverse gear shift lever position 5 by the letter " R ". In these diagrams, these designate the relative positions of the hand engaging the upper part of the lever.

Referring to Figures 3 and 4; the numerals 6 and 7 designate the shifter fork rods. The usual engine shaft 8 has a clutch gear 9, a high and intermediate gear 10, and a low and reverse sliding gear 11. The collars of the high and intermediate sliding gear is numbered 12, and that of the low and reverse gears 13. These collars at present have the shifting fork yokes 14 and 15. The sockets for the lower end of the control lever are indicated at 16 and 17.

The change from the construction shown in Figure 3 to that shown in Figure 4 merely requires the replacement of the shifting forks by others adapted for standard gear shift, in which case the high and intermediate fork is indicated by 18, which indicates the fork yoke engaging the collars 12. The low and reverse shifter fork is indicated by 19, engaging the collars 13. The sockets for the lower end of the control lever are indicated diagrammatically at 20 and 21.

Referring particularly to Figures 5, 6 and 7, which show the high and intermediate shifter fork, the yoke 22 to engage the collars, has engaging faces 23 to bear on substantially diametrically opposite sides of the gear collars. The shifter fork rods pass through the aperture 24, which is drilled to a sliding fit. The control lever socket is indicated at 25, and the transmission lock slot at 26, this being one half of the slot, the opposite half being in the low and reverse shifter fork. The drilled hole or aperture 24 is formed in the two lugs 27, which give a spaced bearing on the shifter fork rods. The specific shape of the shifter forks may be materially changed but that shown in the drawings could be followed, as it is copied from working drawings, and therefore, could be enlarged to the proper size.

The shifter forks for the low and reverse are also shown as taken from working drawings, and the sizes may be considerably changed and modified. In the Figures 8 and 9 and 10 illustrating these forks, the body of the fork is indicated at 28, having the yoke 29, with bearing surfaces 30, for engagement with the gear collars. A pair of downwardly projecting lugs 31 each have a drilled hole or bore 32 to engage and have a sliding fit on the shifter fork rods. Sockets 33 engage the lower end of the control lever. The transmission lock slot 34 is positioned to co-act with the slot 26 in the high and intermediate shifter to lock the transmission in neutral.

It will be manifest that the shifter forks, both for the high and intermediate, and for the low and reverse gears, may be considerably modified to suit different types of sliding gears, different forms of collars on the gears, and arrangement for connecting the control lever to the shifting forks.

Having described my invention, what I claim is:—

1. In a transmission gear shift, parallel left and right shifter rods and a shifting device slidable on each of them, the left shifting device comprising two spaced perforated lugs riding on the left rod having a body section connecting the same and extending forwardly therefrom and having a fork suspended from the body section rearwardly of and in close proximity to the front lug and having a control lever socket in the body section forwardly of and in close proximity to the front lug, and the right shifting device having two lugs spaced farther apart than the former two lugs, and having a body section connecting the two lugs and extending rearwardly therefrom and a fork suspended from the body section rearwardly of and in close proximity to the rear lug and a control lever socket rearwardly of the front lug adapted to be brought into registry with the socket of the left shifting device.

2. In a transmission gear shift, a shifting device for high and immediate speeds comprising two perforated lugs adapted to slide on a rod, a body section connecting the lugs and extending forwardly therefrom and a shifting fork, suspended from the body section rearwardly of and in close proximity to the front lug, the body section being formed with a control lever socket immediately in front of the front lug.

3. In a transmission gear shift, a shifting device for low and reverse speed comprising two perforated lugs adapted to slide on a rod, a body section connecting the lugs and extending rearwardly therefrom and a shifting fork suspended from the body section rearwardly of and in close proximity to the rear lug, the body section being formed with a control lever socket rearwardly of the front lug.

In testimony whereof I affix my signature.

CHARLES FREDERICK GAINE.